(12) United States Patent
Mulloy et al.

(10) Patent No.: US 10,359,977 B2
(45) Date of Patent: Jul. 23, 2019

(54) SERVICE ROUTINE BASED SUPPLY REPLACEMENT DETERMINATION

(71) Applicant: Hewlett-Packard Development Company, L.P., Houston, TX (US)

(72) Inventors: Michael Mulloy, Dublin (IE); William Jon Rittgers, Celbridge (IE); Odhran Hendley, Bray (IE); Bryan Murphy, Lucan (IE); Eduardo Macias, Clonee (IE)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/558,335

(22) PCT Filed: Jun. 15, 2015

(86) PCT No.: PCT/US2015/035743
§ 371 (c)(1),
(2) Date: Sep. 14, 2017

(87) PCT Pub. No.: WO2016/204718
PCT Pub. Date: Dec. 22, 2016

(65) Prior Publication Data
US 2018/0067706 A1 Mar. 8, 2018

(51) Int. Cl.
G06F 3/12 (2006.01)
G03G 15/00 (2006.01)

(52) U.S. Cl.
CPC ......... G06F 3/1235 (2013.01); G03G 15/553 (2013.01); G06F 3/121 (2013.01); G06F 3/1285 (2013.01); G06F 3/1296 (2013.01)

(58) Field of Classification Search
None
See application file for complete search history.

(56) References Cited

U.S. PATENT DOCUMENTS

| 7,106,460 B2 | 9/2006 | Haines et al. |
| 7,997,681 B2 | 8/2011 | Yoshikawa et al. |
| 2002/0126164 A1 | 9/2002 | Walker et al. |
| 2003/0025743 A1* | 2/2003 | Maeda ................. B41J 2/17566 347/7 |
| 2007/0057981 A1 | 3/2007 | Lee et al. |
| 2008/0300899 A1 | 12/2008 | Brown et al. |

(Continued)

FOREIGN PATENT DOCUMENTS

| EP | 0878305 B1 | 7/2001 |
| WO | WO-2013/062508 A1 | 5/2013 |

OTHER PUBLICATIONS

Epson Singapore PTD Ltd. Connect Wirelessly. Save Wisely. Copyright 2014—4 pages.

Primary Examiner — Henok Shiferaw
(74) Attorney, Agent, or Firm — HP Inc. Patent Department

(57) ABSTRACT

Examples include printing devices configured for use with a plurality of replaceable supplies. A remaining amount of printing material may be monitored for each replaceable supply. A set of one or more replaceable supplies to be replaced may be determined based at least in part on the remaining amount of printing material for each replaceable supply and an amount of printing material corresponding to performing a service routine for supply replacement.

5 Claims, 15 Drawing Sheets

(56) References Cited

U.S. PATENT DOCUMENTS

| | | | |
|---|---|---|---|
| 2009/0024542 A1* | 1/2009 | Tanaka | B41J 2/17506 |
| | | | 705/400 |
| 2009/0231367 A1* | 9/2009 | Tsuchiya | B41J 2/16517 |
| | | | 347/7 |
| 2011/0205292 A1 | 8/2011 | Kneezel et al. | |
| 2013/0021408 A1 | 1/2013 | Morgan et al. | |
| 2014/0009792 A1* | 1/2014 | Kanamori | G06F 3/1207 |
| | | | 358/1.15 |

* cited by examiner

SERVICE ROUTINE BASED SUPPLY REPLACEMENT DETERMINATION

BACKGROUND

A printing device, such as a printer, multifunction printer, and/or other such devices may be used to print content onto a physical medium, such as paper. For an ink based printing device, one or more replaceable supplies may be removably coupled to the printer, and the printing device may eject ink stored in the one or more replaceable supplies coupled to the printer to thereby print content onto a physical medium.

DRAWINGS

Figure 5A:
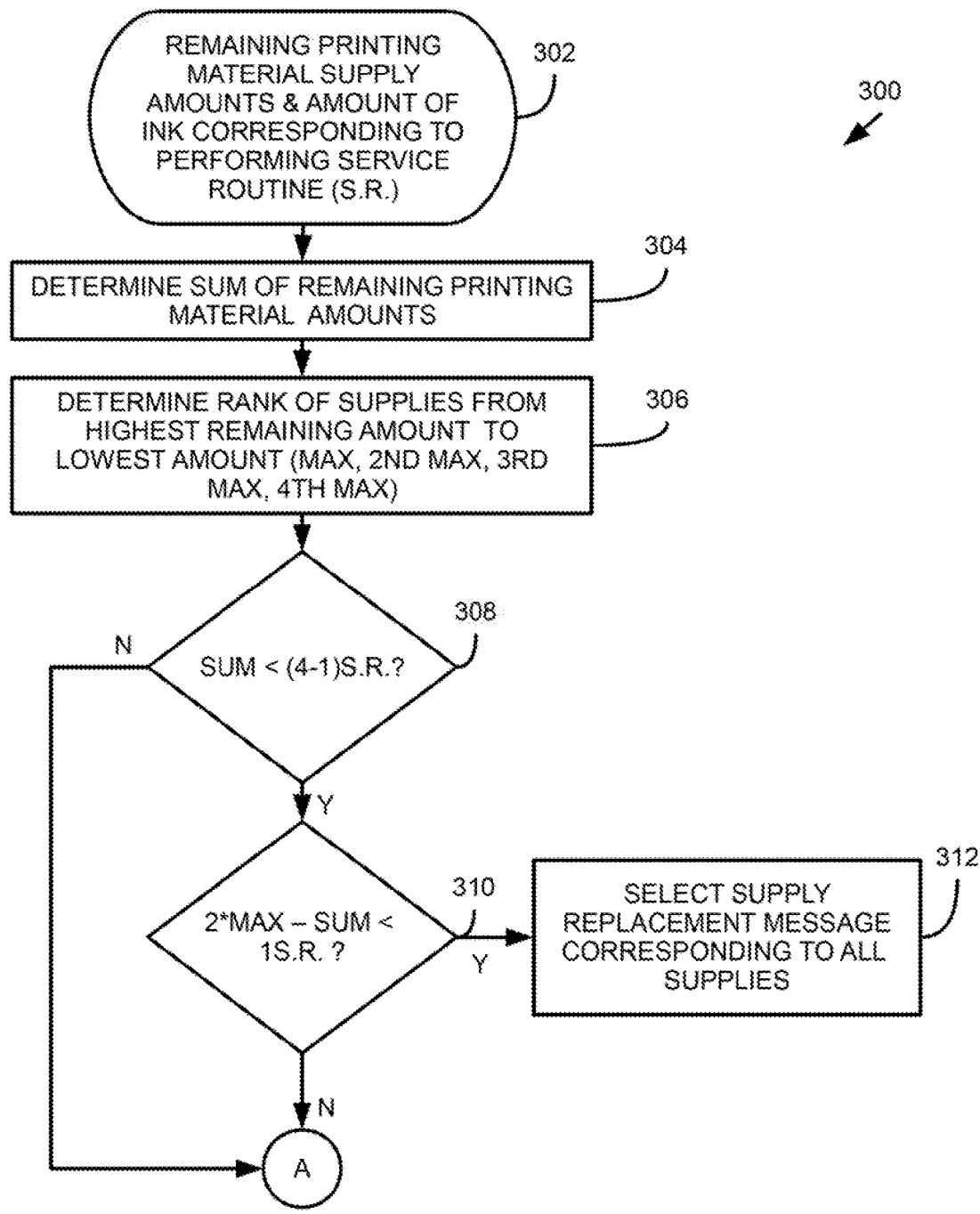
Figure 5B:
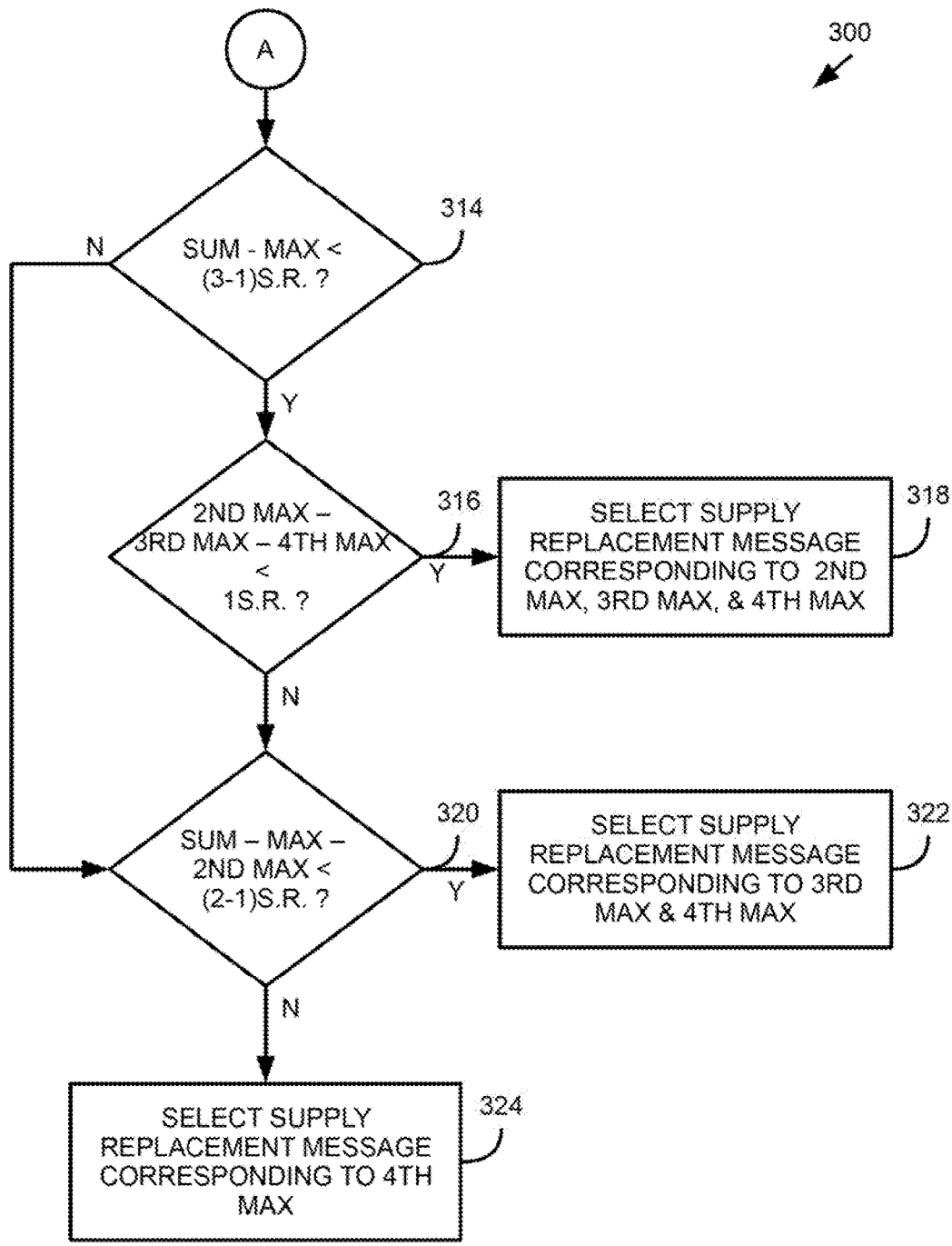

FIGS. 5A-B is a flowchart that illustrates an example sequence of operations that may be performed by an example printing device or embodied as instructions in an example machine-readable storage medium.

Figure 6:
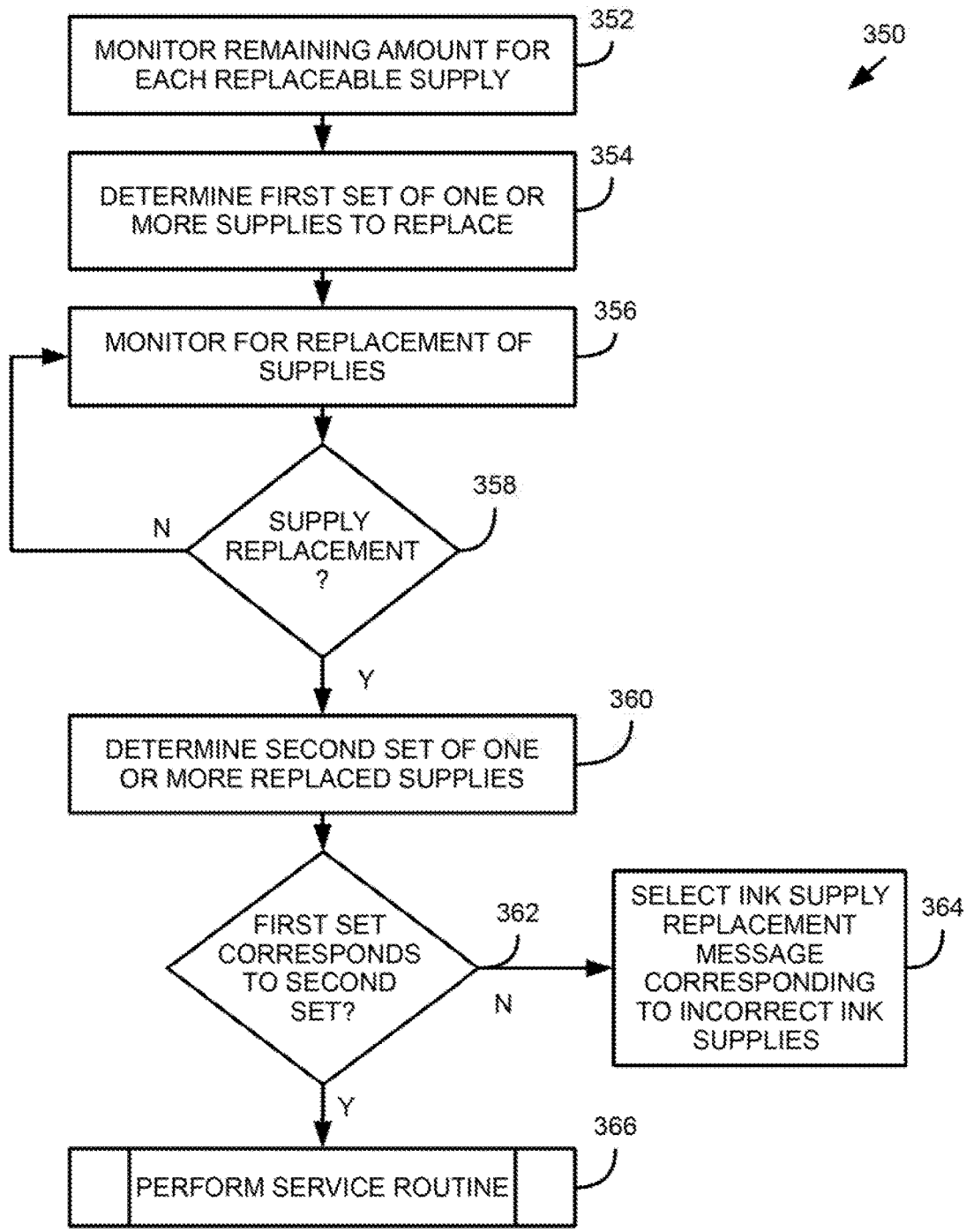

FIG. 6 is a flowchart that illustrates an example sequence of operations that may be performed by an example printing device or embodied as instructions in an example machine-readable storage medium.

Figure 7:
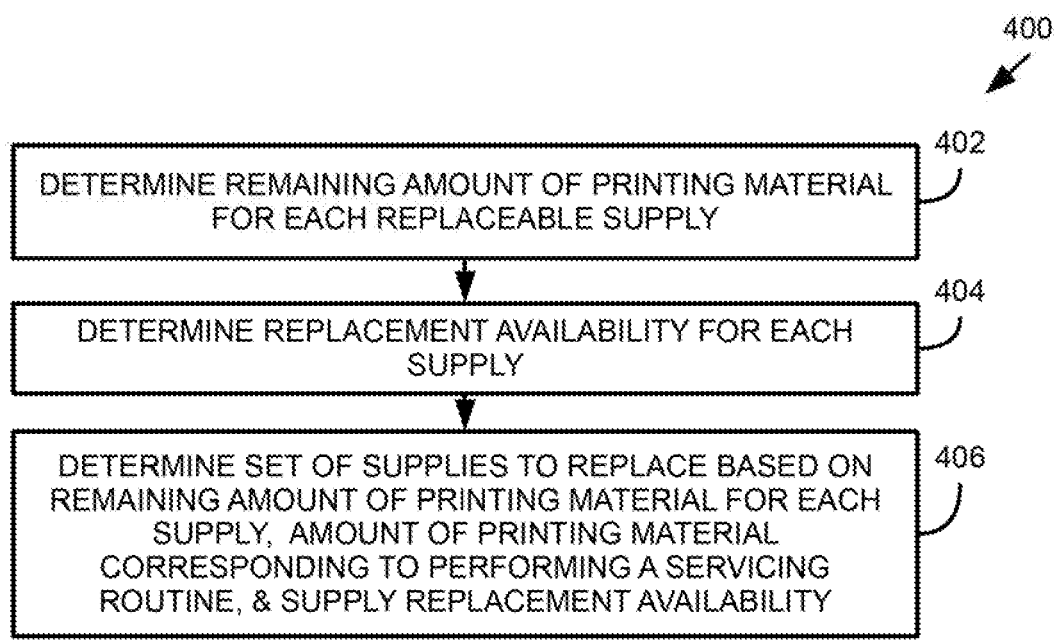

FIG. 7 is a flowchart that illustrates an example sequence of operations that may be performed by an example printing device or embodied as instructions in an example machine-readable storage medium.

Figure 8:
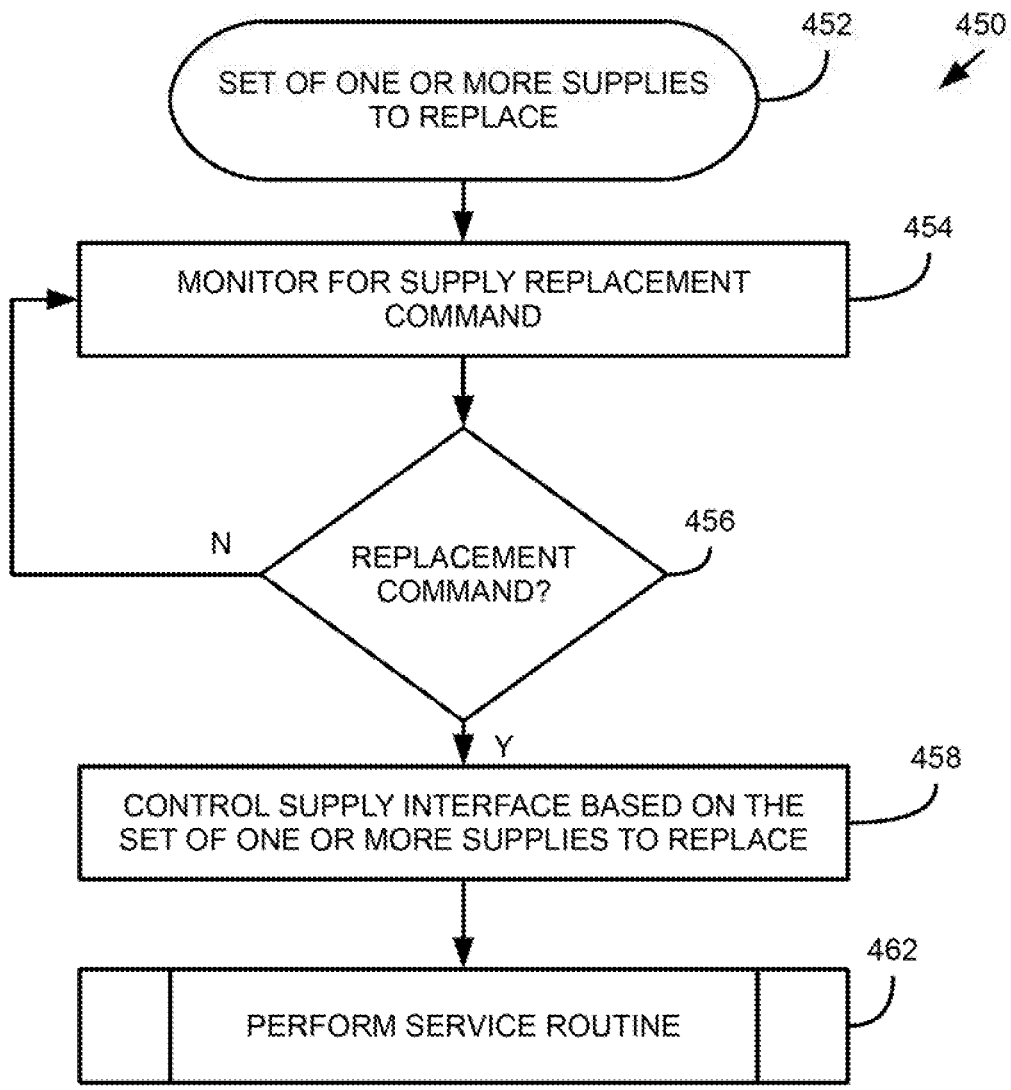

FIG. 8 is a flowchart that illustrates an example sequence of operations that may be performed by an example printing device or embodied as instructions in an example machine-readable storage medium.

Figure 9A:
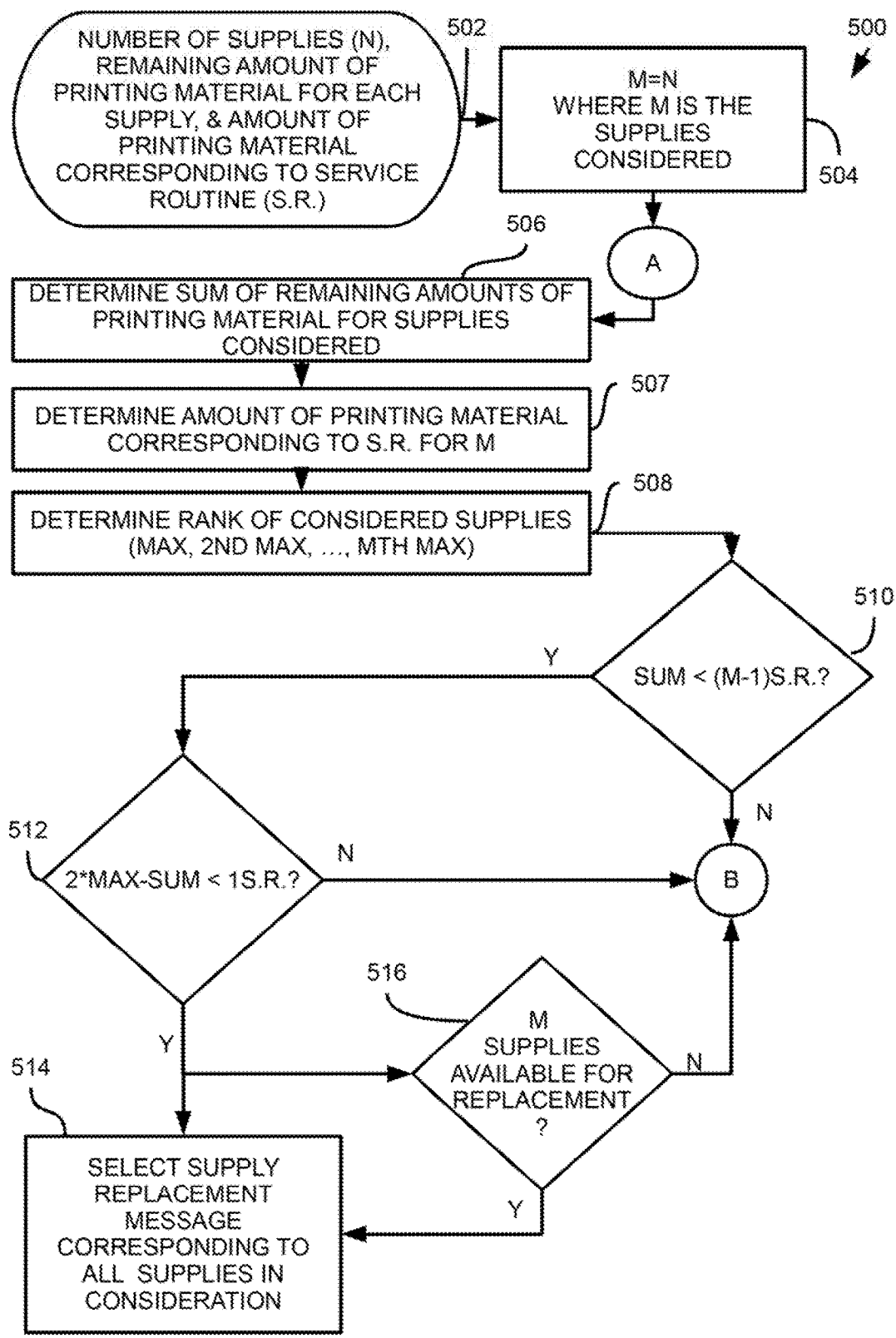
Figure 9B:
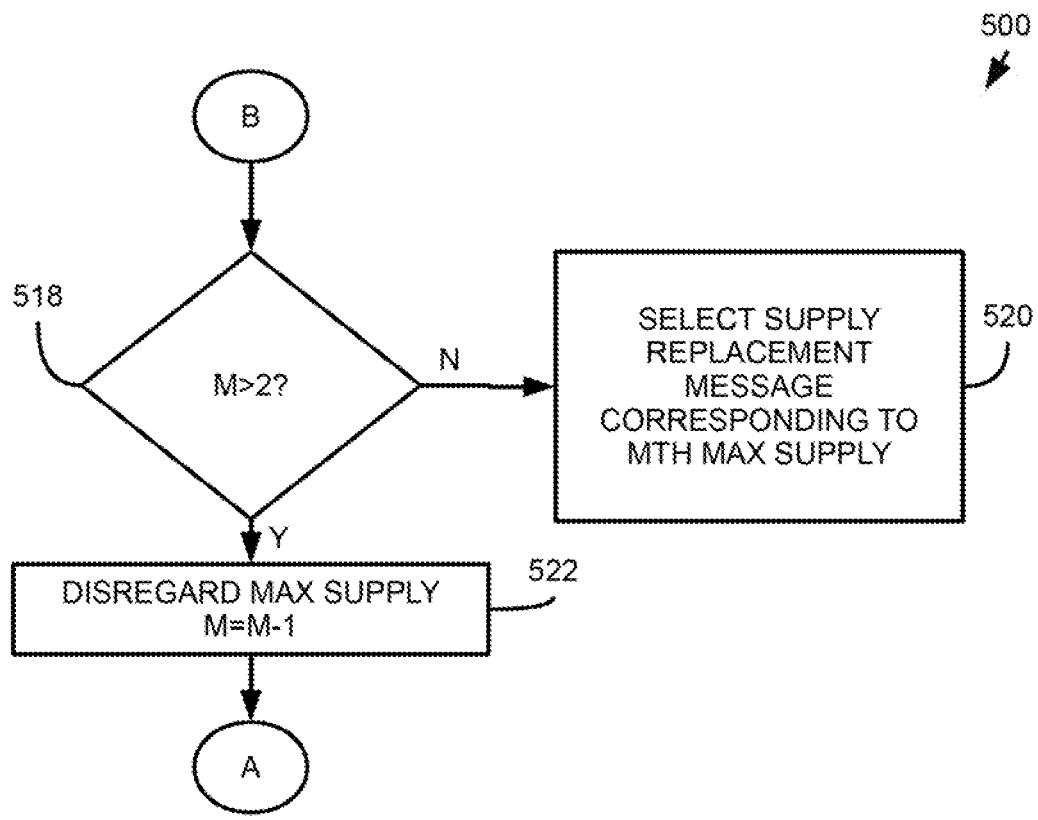

FIGS. 9A-B is a flowchart that illustrates an example sequence of operations that may be performed by an example printing device or embodied as instructions in an example machine-readable storage medium.

Throughout the drawings, identical reference numbers designate similar, but not necessarily identical, elements. Moreover the drawings provide examples and/or implementations consistent with the description; however, the description is not limited to the examples and/or implementations provided in the drawings.

DESCRIPTION

Generally, printing devices, such as ink-based printing devices, may be used with replaceable supplies. When an amount of printing material in a particular replaceable supply is such that the particular supply should be replaced (e.g., the replaceable supply is approximately empty, the remaining amount of printing material is negligible, and/or the remaining amount of printing material is at or below a predefined replacement threshold), the particular replaceable supply may be replaced with another replaceable supply having a full amount of printing material. Generally, amounts of printing material may be described in milliliters, milligrams, and/or other such measurement units. In addition, a predefined replacement threshold may be defined in corresponding measurement units. Replaceable supplies (also referred to as "supplies") generally correspond to containers (e.g., cartridges, printheads, etc.) that store consumables (e.g., ink, toner, colourant, fluids, powders, and/or other raw material for printing) that may be used by the printing device to print content. As used herein, printing material may refer to ink, toner, colourant, fluids, powders, and/or other such raw materials for printing that may be stored in a replaceable supply.

In some examples, replaceable supplies may be removably coupled to a printing device to thereby supply printing material for printing content with the printing device. A replaceable supply that is coupled to the printing device for use by the printing device may be referred to as being "loaded." Similarly, removably coupling a replaceable supply to a printing device may be referred to as "loading" the replaceable supply. For example, some printing devices use printing material corresponding to four colors of ink stored in four replaceable supplies—cyan, magenta, yellow, and black (also referred to as C, M, Y, K, respectively). In this example, when an amount of printing material remaining in a loaded yellow ink supply reaches a predefined replacement threshold, a user may replace the loaded yellow ink supply with a full yellow ink supply. In an example, a predefined replacement threshold may correspond to an amount of printing material being approximately zero measurement units (e.g., the supply is substantially empty, the volume of printing material remaining in the supply is approximately zero milliliters, the mass of printing material remaining in the supply is approximately zero milligrams, etc.). Other examples of printing devices may be configured to use more or less replaceable supplies.

Example printing devices described herein may be two-dimensional printers and/or three-dimensional printers (3D). In some examples, a printing device may be utilized to print content on a physical medium (also referred to as "media"), such as paper or a layer of powder-based build material. In some examples, a printing device may print content by the deposition of consumable fluids in a lawyer-wise additive manufacturing process. Generally, consumable fluids and/or consumable materials may include all materials and/or compounds used, including, for example, ink, toner, fluids or powders, or other raw material for printing. Generally, printing material, as described herein may comprise consumable fluids as well as other consumable materials.

After replacement of a replaceable supply with a new and/or full replaceable supply, the printing device may perform a service routine that primes the new replaceable supply for use. Generally, a service routine may be performed to remove air from the printing device and/car replaceable supply by ejecting printing material with the printing device. In some printing devices, performing a service routine generally uses printing material from each replaceable supply coupled to the printing device for use thereby. For example, in an ink-based printing device, a service routine may cause ink to be expelled from each loaded supply.

Hence, referring to the example four color printing, device described above, if the yellow ink supply is replaced, the service routine performed after the replacement uses an amount of printing material from the cyan, magenta, yellow, and black ink supplies. As a further example, if the magenta ink supply has a remaining amount of printing material such that after performing the service routine for replacing the yellow supply, the remaining amount of printing material for the magenta ink replaceable ink supply is approximately empty, a second service routine may be performed after replacing the magenta ink supply. As will be appreciated in this example, performing the two service routines uses an amount of printing material remaining in the black, cyan, and yellow ink supplies by an amount of printing material corresponding to performing the two service routines, and, in this example, an amount of printing material corresponding to performing one service routine is used from the magenta ink supply.

Examples described herein may therefore determine a set of one or more supplies to replace based at least in part on an amount of printing material remaining in each supply and an amount of printing material corresponding to performing one or more service routines. Referring to the example ink-based printing device, the example printing device may determine that the yellow ink supply and the magenta ink supply should be replaced concurrently. As will be appreciated, the remaining amount of printing material for the magenta ink supply does not correspond to the replacement threshold when the remaining amount of printing material for the yellow ink supply indicates that the yellow ink supply should be replaced. However, due to the amount of printing material used to perform a service routine, the printing device may determine that the magenta ink supply should be replaced concurrent with replacement of the yellow ink supply. By determining that the magenta ink supply should be replaced concurrently, the printing device may perform only one service routine (as compared to the two service routines described above). Therefore, in this example, ink may be saved by performing only one service routine. In a further example of the ink-based printing device, the printing device may determine to concurrently replace all supplies, three supplies, or only one supply based on the amount of printing material remaining in each supply and an amount of printing material that may be used to perform one or more service routines.

Examples described herein may monitor a remaining amount of printing material for each replaceable supply removably coupled to a printing device for use thereby. Based on the remaining amount of printing material for each replaceable supply and an amount of printing material corresponding to performing one or more service routines, a set of one or more supplies to replace may be determined. In some examples, a supply replacement message may be selected from a plurality of supply replacement messages based at least in part on the determined set of one or more supplies to replace. Generally, the replaceable supplies of the set may be replaced concurrently, such that only one service routine may be performed after replacement of the set of supplies. Moreover, replacement of supplies concurrently generally refers to a replacement of supplies such that only one service routine is performed after such replacement.

Figure 1:
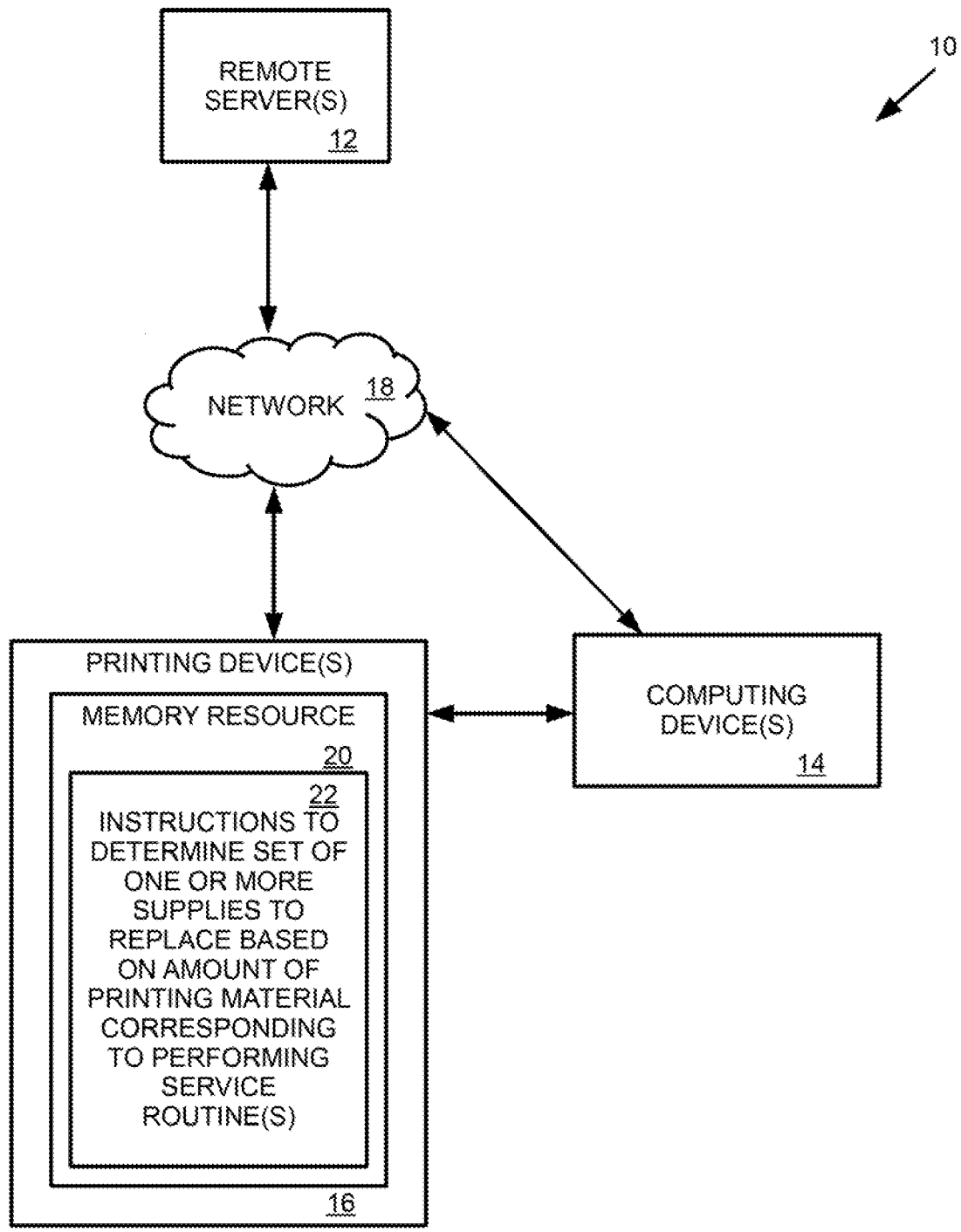
FIG. 1 is a block diagram of an example computing environment including at least one remote server, at least one local computing device, and at least one printing device.

Turning now to FIG. 1, this figure provides a block diagram of an example computing environment 10. In this example, one or more remote servers 12, one or more computing devices 14, and/or one or more printing devices 16 may be connected to a communication network 18. Generally, the communication network 18 may comprise the Internet, a local area network (LAN), a wide area network (WAN), a cellular voice/data network, one or more high speed bus connections, and/or other such types of communication networks. Furthermore, as shown in this example, a computing device 14 may also be connected to a printing device 16 via local hardware ports (such as a USB connection therebetween). Generally, the one or more computing devices 14 may comprise a personal computer, a portable electronic device (e.g., a smart phone, a tablet, a laptop, etc.), a workstation, smart device, server, printing device, and/or any other such data processing devices. As shown, an example printing device 16 may comprise a memory resource 20 that stores instructions to determine a set of one or more replaceable supplies to replace based at least in part on an amount of printing material corresponding to performing one or more service routines 22.

Figure 2A:
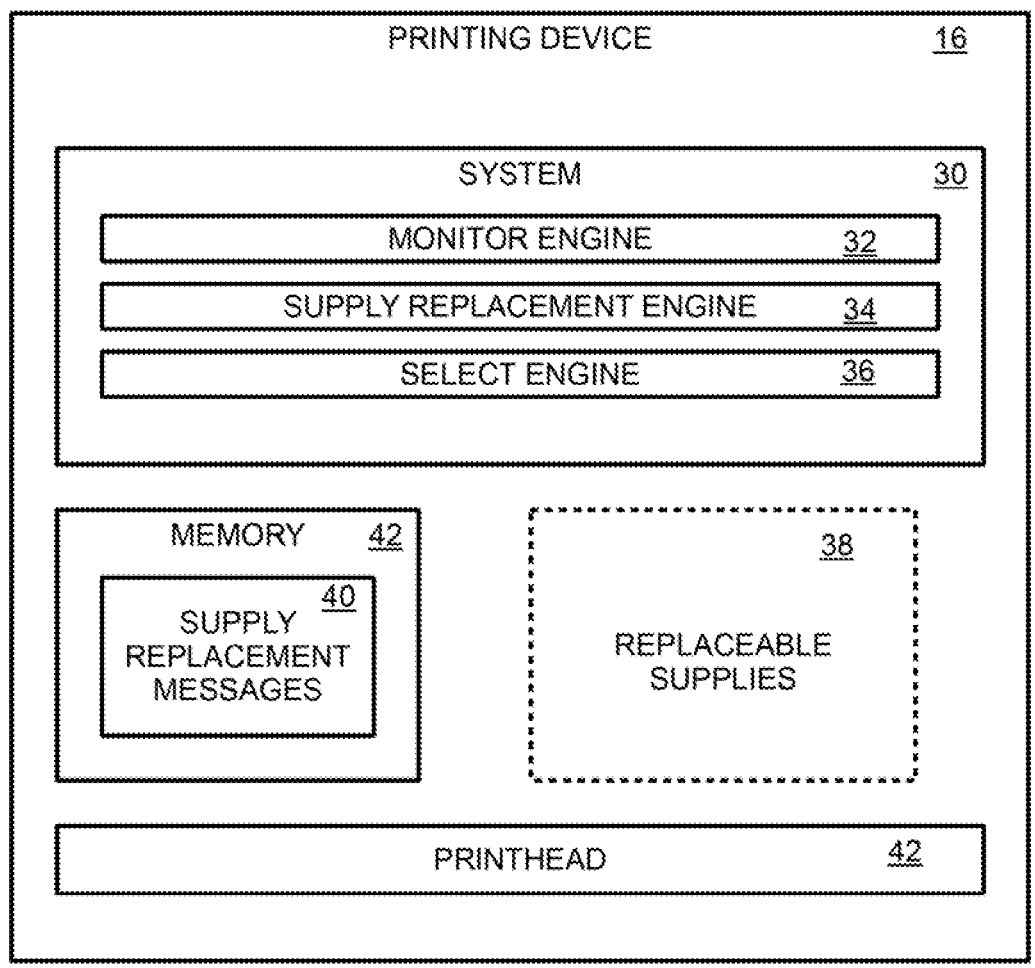
FIG. 2A is a block diagram of an example printing device.

FIG. 2A provides a block diagram of an example printing device 16. As shown, the example printing device 16 comprises a system 30 including engines 32-36 for monitoring remaining amounts of printing material for replaceable supplies 38 loaded into the printing device 16 and determining a set of one or more supplies 38 to replace based at least in part on the remaining amount of printing material for each replaceable supply 38 and an amount of printing material corresponding to performing one or more service routines associated with supply replacement. The printing device 16 comprises a monitor engine 32 to monitor a remaining amount of printing material for each supply 38 removably coupled to (i.e., loaded into) the printing device 16. The printing device comprises a supply replacement engine 34 to determine a set of one or more supplies 38 to replace based at least in part on the remaining amount of printing material for each supply 38 and an amount of printing material corresponding to performing one or more service routines associated with supply replacement. The printing device 16 comprises a select engine 36 to select a particular supply replacement message 40 that corresponds to the set of one or more supplies 38 to replace from a plurality of supply replacement messages 40 stored in a memory 42 (also referred to herein as a "memory resource") of the printing device 16. Furthermore, the printing device 16 includes a printhead 42 configured to eject printing material stored in replaceable supplies 38 loaded in the printing device 16.

Figure 2B:
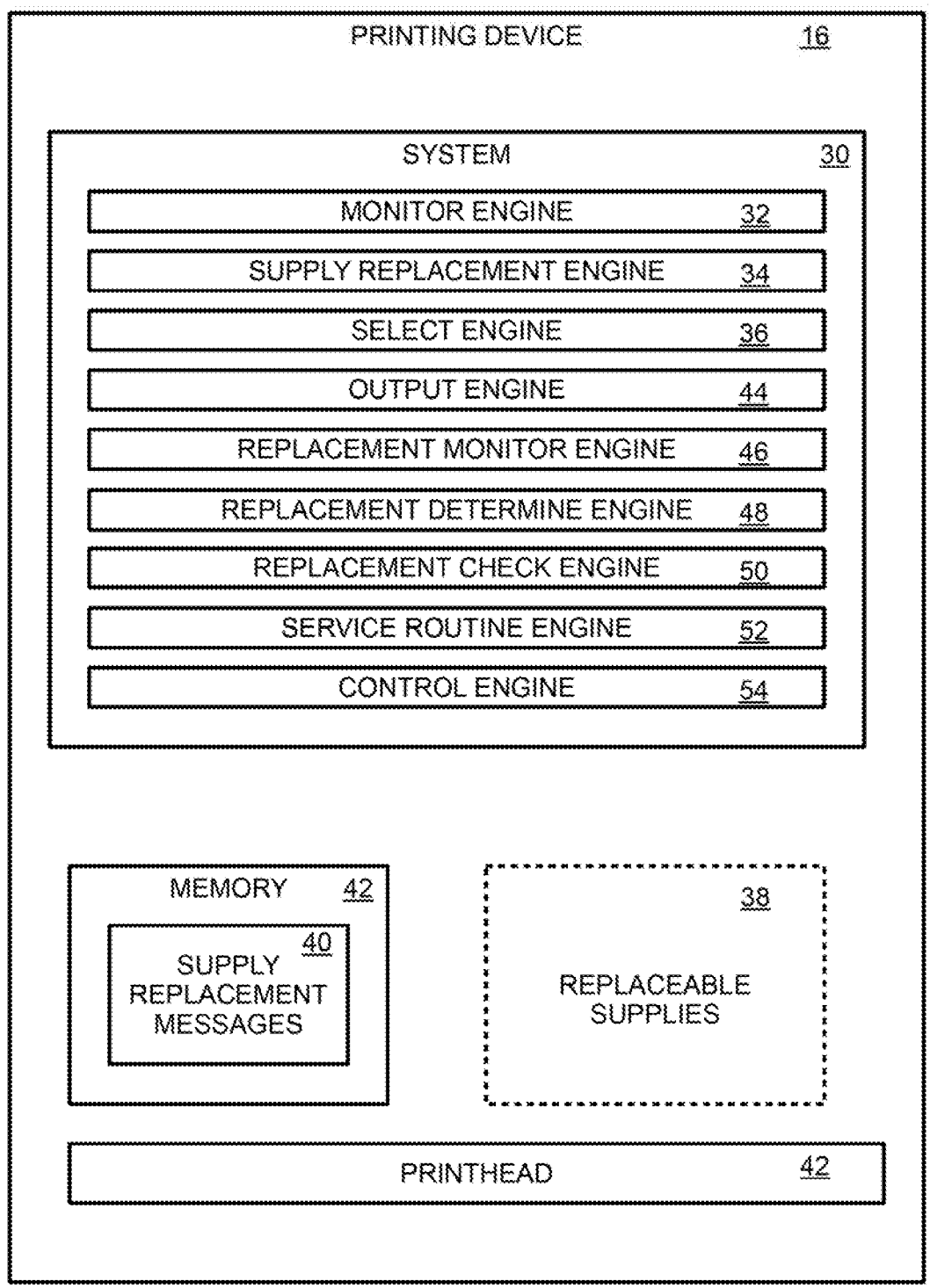
FIG. 2B is a block diagram of an example printing device.

FIG. 2B provides a block diagram of an example printing device 16 that may include an output engine 44 to output a particular supply replacement message 40 via a user interface associated with the printing device 16. The example printing device 16 may further comprise a replacement monitor engine 46 to monitor, with at least one sensor associated with the replaceable supplies 38, replacement of one or more supplies 38 of the replaceable supplies 38. In addition, the printing device 16 may comprise a replacement determine engine 48 to determine a set of supplies 38 that were replaced. The printing device 16 may further comprise a replacement check engine 50 to determine whether the set of supplies 38 determined to be replaced by the supply replacement engine 34 correspond to the set of supplies 38 that were replaced as determined by the replacement determine engine 48. The printing device 16 may further comprise a service routine engine 52 to perform a service routine. Furthermore, the printing device 16 may comprise a control engine 54 to control a replaceable supply interface 136 to thereby facilitate replacement and/or prevent replacement of replaceable supplies 38 based on the set of supplies 38 to be replaced as determined by the supply replacement engine 34. As will be appreciated, the operations and sequences of operations described with regard to engines 32-36, 44-54 may be performed in one or more engines that may be implemented in a printing device 16.

Generally, examples of printing devices 16 described herein may not be limited to the specific implementations of engines. In this regard, some examples of printing devices 16 may be configured with more or less engines, where engines may be configured to perform more or less operations. Furthermore, in some examples, the engines may be implemented by execution of instructions with one or more processing resources to cause the processing resources to perform the corresponding operations. Moreover, each of engines 32-36, 44-54 may be any combination of hardware and programming to implement the functionalities of the respective engines. In some examples described herein, the combinations of hardware and programming may be implemented in a number of different ways. For example, the programming for the engines may be processor executable instructions stored on a non-transitory machine-readable storage medium and the hardware for the engines may include a processing resource to execute those instructions. In these examples, example printing device 16 may include the machine-readable storage medium storing the instructions and the processing resource to execute the instructions, or the machine-readable storage medium may be separate by accessible to the printing device 16 and the processing resource. In some examples, engines 32-36, 44-54 may be implemented in circuitry.

Figure 2C:
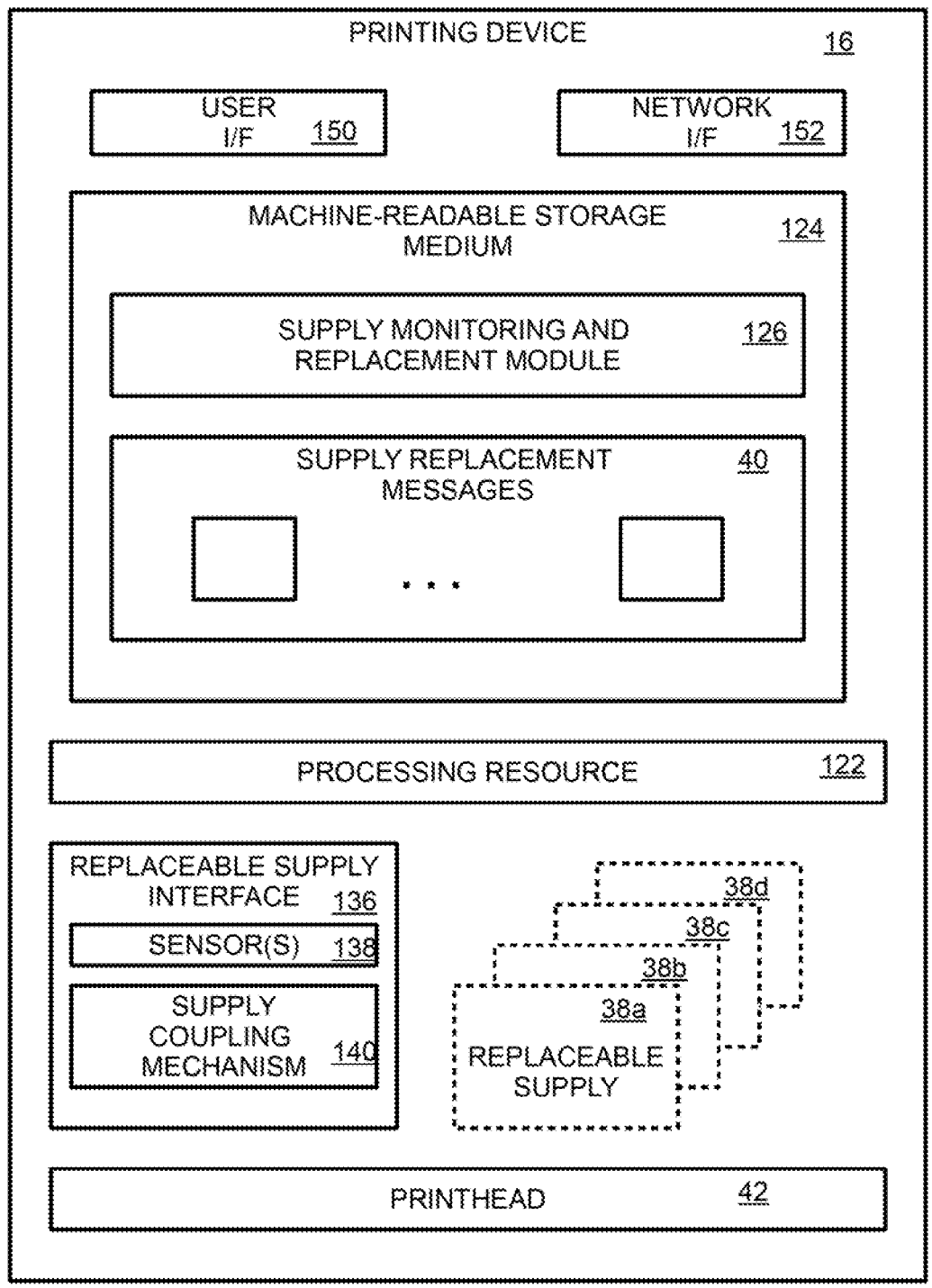
FIG. 2C is a block diagram of an example printing device.

FIG. 2C provides a block diagram of an example printing device 16. As shown, the example printing device 16 comprises a processing resource 122 and a machine-readable storage medium 124, which may be referred to as a memory and/or a memory resource. In the examples described herein, a processing resource 122 may include at least one hardware-based processor. Furthermore, the processing resource 122 may include one processor or multiple processors, where the processors may be configured in a single printing device 16 or distributed across multiple computing devices and/or printing devices 16 connected locally and/or remotely, such as via the communication network 18.

The memory 124 may be encoded with and/or store instructions that may be executable by the processing resource 122, where execution of such instructions may cause the processing resource 122 and/or printing device 16 to perform the functionalities/sequences of operations described herein. The machine-readable storage medium 124 may represent the random access memory (RAM) devices comprising the main storage of the printing device 16, as well as any supplemental levels of memory, e.g., cache memories, non-volatile or backup memories (e.g., programmable or flash memories), read-only memories, etc. In addition, memory 124 may be considered to include memory storage physically located elsewhere, e.g., any cache memory in a microprocessor, as well as any storage capacity used as a virtual memory, e.g., as stored on a mass storage device or on another computer in communication with the printing device 16. Furthermore, the memory 124 may be non-transitory.

In this example, the memory 124 may store a supply monitoring and replacement module 126 and a plurality of supply replacement messages 40. The supply monitoring and replacement module 126 generally comprises instructions, that when executed by the processing resource 122, may cause the processing resource 122 and/or the printing device 16 to perform sequences of operations disclosed herein. Generally, execution of the instructions of the supply monitoring and replacement module 126 may cause the processing resource 122 to monitor a remaining amount of printing material for each replaceable supply 38a-d removably coupled to the printing device 16 for use by the printing device 16, and determine a set of one or more supplies 38a-d to replace based at least in part on the remaining amount of punting material for each supply 38a-d and an amount of printing material corresponding to performing one or more service routines. In some examples, the supply monitoring and replacement module 126 may store instructions, that when executed by a processing resource 122 may cause the processing resource 122 to perform operations described with regard to the engines 32-36, 44-54.

In some examples, execution of the instructions of the supply monitoring and replacement module 126 may cause the processing resource 122 to select a particular supply replacement message 40 from the plurality of supply replacement messages 40, where the particular supply replacement message 40 corresponds to the set of one or more supplies 38a-d to replace and/or one or more supplies 38a-d that were incorrectly replaced.

As discussed, in this example, the memory 124 stores a plurality of supply replacement messages 40. Generally, each supply replacement message 40 may correspond to a possible set of one or more supplies 38a-d to replace and/or a possible set of one or more supplies 38a-d that were incorrectly replaced. For example, with regard to the example four replaceable ink supply printing device described above, the memory 124 may store a particular supply replacement message 40 that corresponds to the set of ink supplies to replace comprising the yellow ink supply and the magenta ink supply. Continuing the example, the memory 124 may store a particular supply replacement message 40 that corresponds to the set of ink supplies to replace comprising the cyan ink supply, the magenta ink supply, the yellow ink supply, and the black ink supply. As will be appreciated, the plurality of supply replacement messages 40 stored in the memory 124 generally correspond to the configuration of the printing device 16—i.e., the plurality of supply replacement messages 40 correspond to the various possible combinations of supplies 38 that may be determined to be concurrently replaced. Similarly, the supply replacement messages 40 may correspond to replaceable supplies 38a-d that were incorrectly replaced. Referring again to the ink-based printing device 16 example, if the yellow ink supply and the magenta ink supply were determined to be concurrently replaced, and the yellow ink supply, magenta ink supply, and cyan ink supply were replaced, the example printing device 16 may select a particular supply replacement message that indicates that the cyan ink supply was incorrectly replaced.

The example printing device 16 further comprises a printhead 42 that is generally configured to transfer printing material onto a medium. For example, printhead 42 may comprise a plurality of print nozzles from which ink may eject. As will be appreciated, the printhead 42 may comprise a plurality of fluid ejectors associated with the print nozzles that may cause drops of ink to be ejected through the print nozzles. Various types and configurations of fluid ejectors and print nozzles may be implemented in example printing devices 16 described herein. For example, the printhead 42 may comprise thermal fluid ejectors and/or piezoelectric fluid ejectors. Other examples may be configured with other types of printheads. In addition, printhead 42 may be configured as a fixed, page-wide printhead, a scanning printhead, or other such configurations. Furthermore, some examples of the printing device 16 may be configured as an on-axis ink delivery system, and other examples of the printing device 16 may be configured with an off-axis ink delivery system. Other examples of the printing device may comprise other such configurations. Some examples may be configured to deliver/deposit fluids in a layer-wise additive manufacturing process.

The example printing device 16 comprises a supply interface 136, where the supply interface 136 comprises one or more sensors 138 and a supply coupling mechanism 140. In general, the one or more sensors 138 may be configured to determine a remaining amount of printing material for each replaceable supply 38*a-d* loaded for use by the printing device 16. In addition, the one or more sensors 138 may be configured to detect whether a replaceable supply 38*a-d* is loaded via the supply coupling mechanism 140. Generally, the supply coupling mechanism 140 may removably couple with a plurality of replaceable supplies 38*a-d*. In this example, the printing device 16 is illustrated as being configured to use four replaceable supplies 38*a-d*; however other printing devices may be configured to use more or less supplies. As will be noted, the replaceable supplies 38*a-d* are illustrated in phantom for reference purposes. Generally, the replaceable ink supplies 38*a-d* may not form a component of an example printing device 16, but rather example printing devices may be configured to removably couple with replaceable supplies 38*a-d* for supply 38 of printing material stored in the replaceable supplies 33*a-d*. As will be appreciated, printing material stored in a removable supply 38*a-d* coupled to the printing device 16 via the supply coupling mechanism 140 may be communicated to the printhead 42 for printing content.

The supply coupling mechanism 140 may be controlled by the processing resource 122 such that replaceable supplies 38*a-d* may be made available for replacement. For example, the supply coupling mechanism 140 may comprise a cover or other such access limiting mechanism (which may be referred to as "a supply access cover") that may open to allow access to a replaceable supply 38*a-d* for replacement. In this example, the cover may prevent access by a user to supplies 38*a-d* that should not be replaced. Furthermore, in some examples, the supply coupling mechanism 140 may be configured to selectively lock/unlock replaceable supplies 38*a-d* loaded for use by the printing device 16. In these examples, the printing device 16 may thereby facilitate replacement one or more supplies 38*a-d* and prevent replacement of one or more other supplies 38*a-d* that should not be replaced by selectively locking/unlocking each of the plurality of replaceable supplies 38*a-d*. As will be appreciated, in these examples, the supply coupling mechanism 140 may comprise a selectively actuatable latch and/or other such mechanism for locking/unlocking.

In some examples, the supply coupling mechanism 140 may comprise a release mechanism that may be configured to selectively actuate each replaceable supply 38*a-d* based on whether the replaceable supply 38*a-d* is determined to be in the set of supplies 38*a-d* to replace. For example, the release mechanism may cause a particular replaceable supply 38*a-d* to disengage from the supply coupling mechanism 140 and be moved to a position where a user may access the particular replaceable supply 38*a-d* for removal. In addition, the supply coupling mechanism 140 may comprise one or more indicators positioned proximate each replaceable supply 38*a-d*, where such indicators may be selectively actuated to identify replaceable supplies 38*a-d* to be replaced. For example, the one or more indicators may comprise one or more light emitting diodes (LEDs) and/or other similar visual indicators. The processing resource 122 may be configured to execute one or more instructions stored in the memory 124 that may cause the processing resource 122 to control the supply interface 136 and/or supply coupling mechanism 140 as described in the various examples.

For interface with a user or operator, the example printing device 16 may include a user interface 150 incorporating one or more user input/output devices, e.g., one or more buttons, a display, a touchscreen, a speaker, etc. The user interface 150 may therefore communicate data to the processing resource 122 and receive data from the processing resource 122. For example, a user may input one or more selections via the user interface 150, and the processing resource 122 may cause data to be output on a screen or other output device of the user interface 150. Furthermore, the printing device 16 may comprise a network interface device 152. Generally, the network interface device 152 comprises a hardware device to communicate data over one or more communication networks (e.g., the communication network 18 of FIG. 1.) such as a network interface card.

Figure 2D:
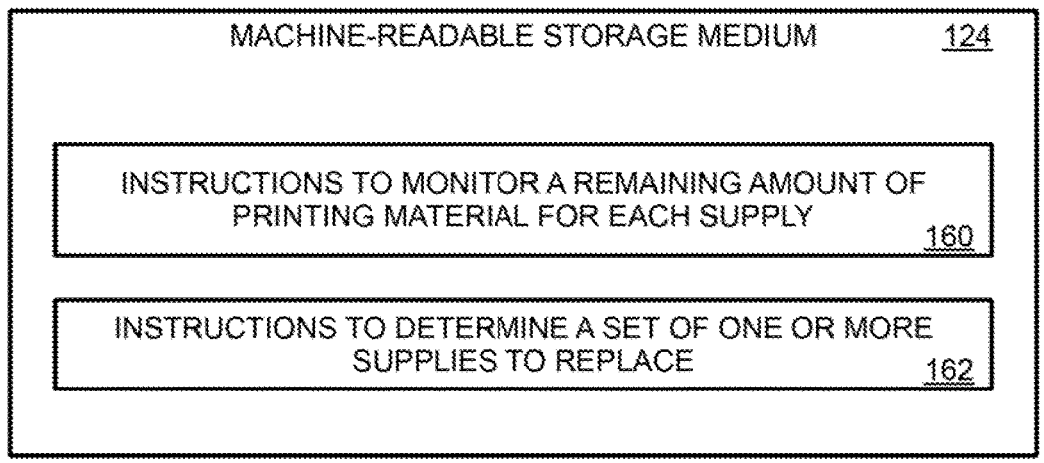
FIG. 2D is a block diagram of an example machine-readable storage medium.

FIG. 2D provides a block diagram of an example machine-readable storage medium, such as the machine-readable storage medium 124 of FIG. 2C. In this example, the machine-readable storage medium 124 comprises instructions 160-162 that may be executed by a processing resource 122 to cause the processing resource 122 to perform operations corresponding thereto. In particular, the machine-readable storage medium 124 may comprise instructions to monitor a remaining amount of printing material for each of a plurality of replaceable supplies 38 loaded for use in a printing device 16. The machine-readable storage medium 124 may comprise instructions to determine a set of one or more supplies 38 to replace based at least in part on a remaining amount of printing material for each supply 38 and an amount of printing material corresponding to performing at least one service routine 162.

Figure 2E:
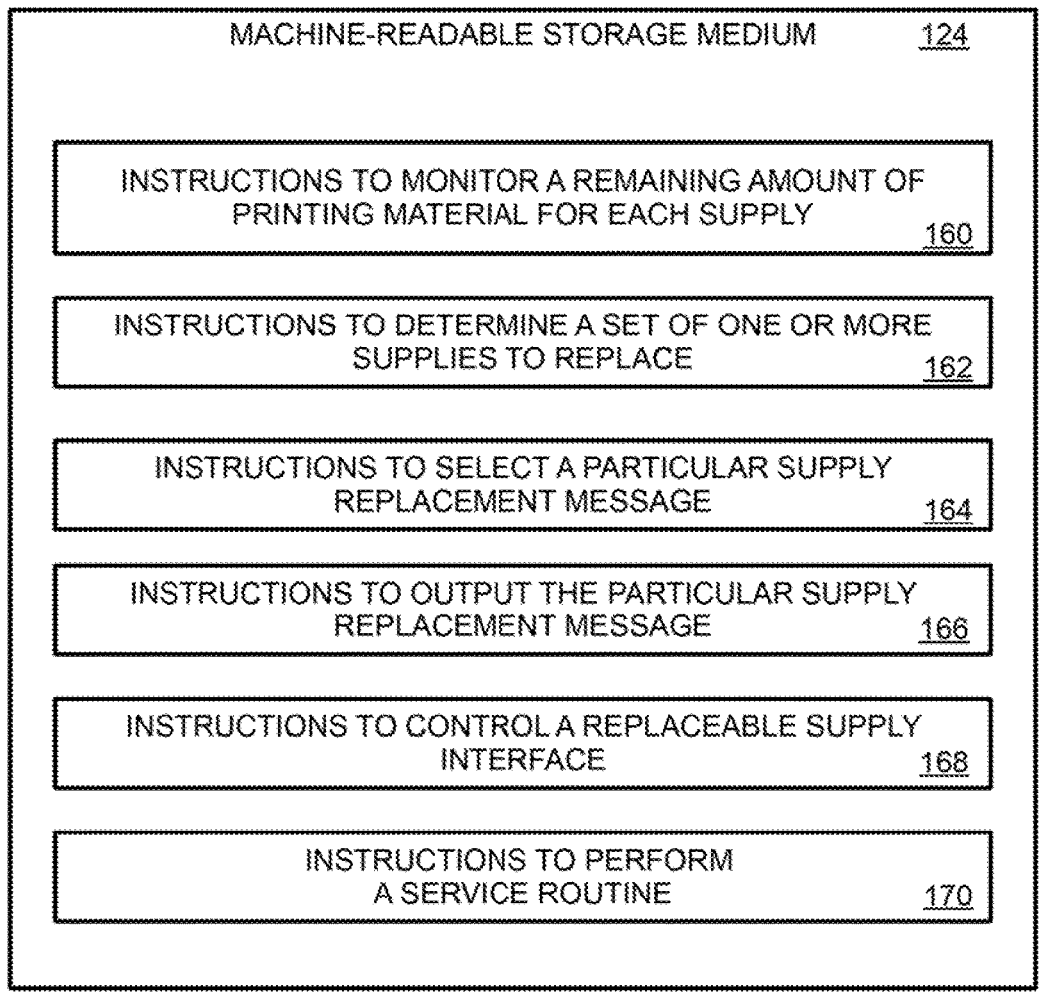
FIG. 2E is a block diagram of an example machine-readable storage medium.

FIG. 2E provides a block diagram of an example machine-readable storage medium, such as the machine readable storage medium 124 of FIG. 2. In addition to the instructions 160-162 of FIG. 2D, the machine-readable storage medium 124 may comprise instructions to select a particular supply replacement message 40 from a plurality of supply replacement messages 40 based at least in part on the set of one or more supplies 38 to replace 164. Furthermore, the machine-readable storage medium 124 may comprise instructions to cause the processing resource 122 to output the particular supply replacement message via an associated user interface 166. Additionally, the machine-readable storage medium 124 may comprise instructions to control a replaceable supply interface 136 based at least in part on the set of one or more supplies 38 to replace 168. The machine-readable storage medium 124 may further comprise instructions to perform a service routine associated with supply replacement 170.

FIGS. 3-9B provide flowcharts that provide example sequences of operations that may be performed by an example printing device 16 and/or a processing resource 122 thereof to perform example processes and methods of the disclosure. In some examples, the operations included in the flowcharts may be embodied in a memory (such as the memory resource 20 of FIG. 1, the memory resource 42 of FIGS. 2A-B, and/or the machine-readable storage mediums 124 of FIGS. 2C-E) in the form of instructions that may be executable by a processing resource 122 to cause the processing resource 122 and/or an example printing device 16 to perform the operations corresponding to the instructions. In these examples, the processing resource 122 of the example printing device 16 may execute the instructions, which may cause the processing resource 122 and/or the printing device 16 to perform the operations described herein. Moreover, the examples described with respect to FIGS. 3-9B may generally be performed by an example printing device 16 and/or a processing resource 122 thereof. Additionally, the examples provided in FIGS. 3-9B may be embodied in printing devices, machine-readable storage mediums, processes, and/or methods. In some examples, the example processes and/or methods disclosed in the flowcharts of FIGS. 3-9B may be performed by one or more engines implemented in a printing device 16, such as the example engines 32-36, 44-54 of FIGS. 2A-B.

In some examples, an amount of printing material corresponding to performing one or more service routines may be a defined value that may be stored in a memory resource (such as memory resource 20, memory 42, machine-readable storage medium 124, etc.). Similarly, a predefined replacement threshold may be stored in a memory resource. Generally, such predefined values may be referred to as parameters, where such parameters may vary dependent on the type of printing device, hardware and/or firmware configuration of a printing device, and/or one or more engines, components, or instructions implemented for a printing device. Furthermore, in some examples, the parameters may be modified (such as during a firmware update) and/or the parameters may be communicated to the printing device for implementation in engines, instructions, and/or components thereof by a remote computing device (such as the remote servers 12 and/or the computing devices 14 of FIG. 1.).

Figure 3:
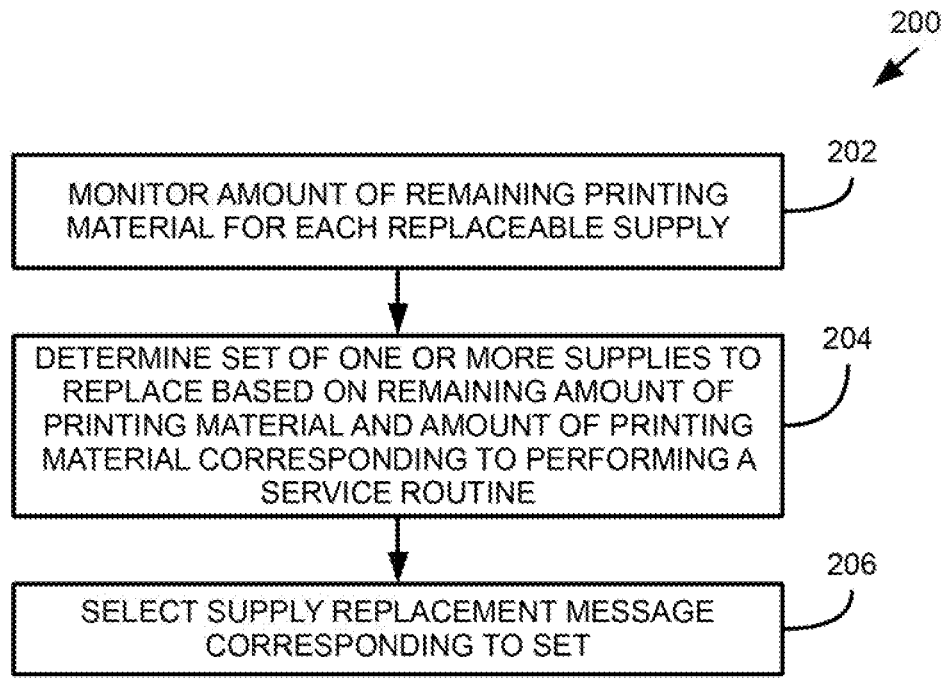
FIG. 3 is a flowchart that illustrates an example sequence of operations that may be performed by an example printing, device or embodied as instructions in an example machine-readable storage medium.

FIG. 3 is a flowchart 200 that illustrates an example sequence of operations that may be performed by the printing device 16 and/or the processing resource 122. The printing device 16 may monitor an amount of remaining printing material for each replaceable supply 38 loaded for use by the printing device 16 (block 202). In some examples, the printing device 16 may include one or more sensors 138 that may be controlled by the processing resource 122 such that the processing resource 122 may receive sensor data from the sensors 138 that may be processed by the processing resource 122 to determine a remaining amount of printing material for each loaded replaceable supply 38. In these examples, the printing device 16 may monitor the remaining amount of printing material for each removable supply 38 based on the sensor data.

Based on the remaining amount of printing material for each supply 38 and the amount of printing material corresponding to performing a service routine for supply replacement, the printing device 16 may determine a set of one or more supplies 38 to replace (block 204). For example, if the printing device 18 is configured to use four colors of ink (and therefore may removably couple with four replaceable ink supplies), the printing device may determine to replace some or all of the ink supplies concurrently based at least in part on the amount of printing material corresponding to performing a servicing routine. Based on the set of one or more supplies 38 to replace, the printing device 16 may select a particular supply replacement message from a plurality of possible supply replacement messages stored in the memory 42 of the printing device 16 (block 206).

Figure 4:
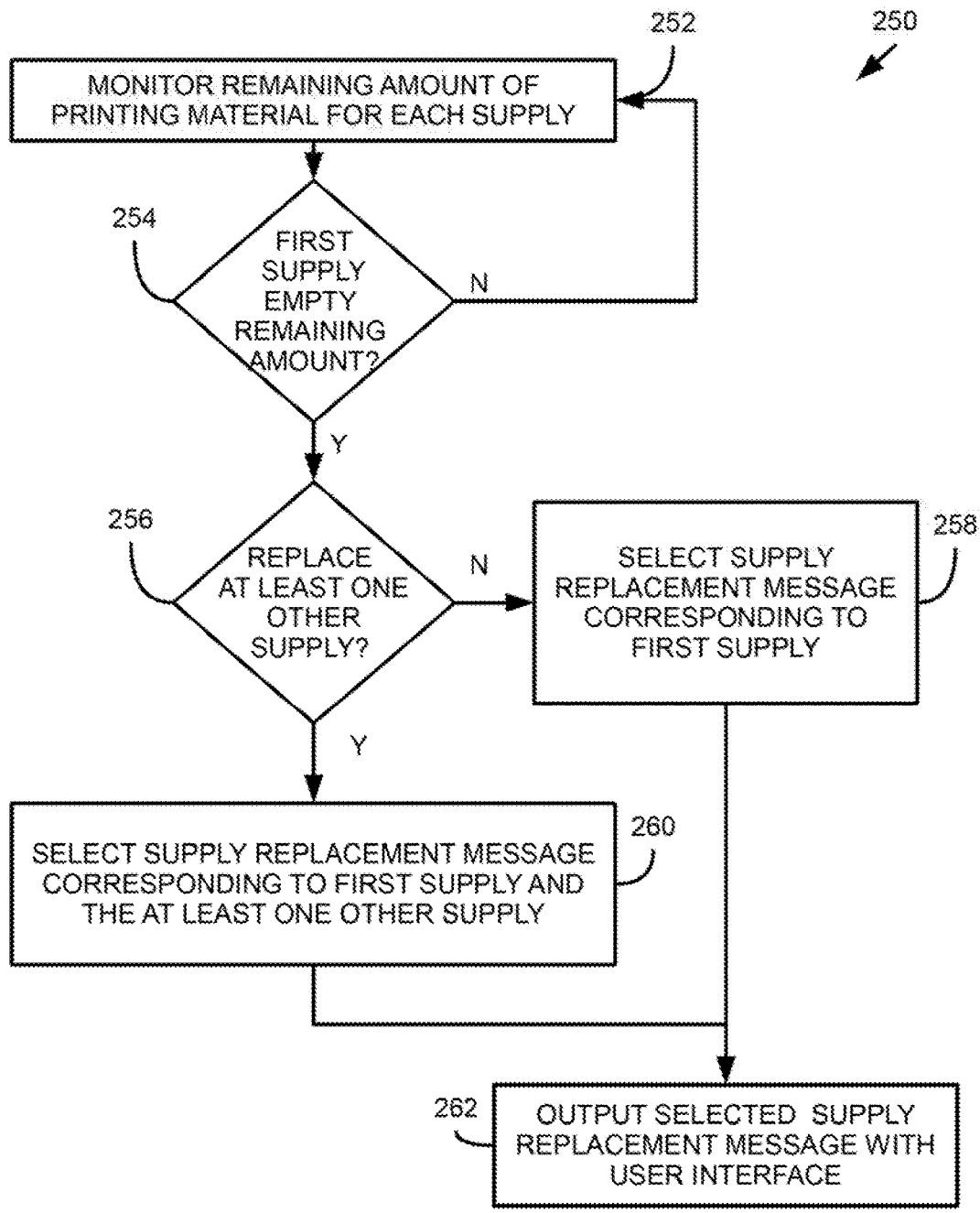
FIG. 4 is a flowchart that illustrates an example sequence of operations that may be performed by an example printing device or embodied as instructions in an example machine-readable storage medium.

FIG. 4 is a flowchart 250 that illustrates an example sequence of operations that may be performed by an example printing device 18. In this example, the printing device 16 may monitor a remaining amount of printing material for each loaded replaceable supply 38 to detect an empty remaining amount for a first supply 38 of the plurality of replaceable supplies 38 (blocks 252-254). If the remaining amount for each replaceable supply 38 is not empty ("N" branch of block 254), the printing device 16 continues monitoring the remaining amount of printing material for each supply 38 (blocks 252-254).

In some examples, a replaceable supply 38 may be determined to be empty (i.e., have a remaining amount of printing material corresponding to empty) based on a predefined replacement threshold, where the predefined replacement threshold may define a remaining amount of printing material for which the replaceable supply 38 is considered empty. For example, a replaceable supply 38 may be determined to be empty when sensor data received at the processing resource 122 indicates that the remaining amount of printing material is negligible (e.g., an amount lower than a measurement accuracy associated with the sensor collecting the sensor data), approximately zero, and/or equal to or less to a predefined amount.

In response to determining that a first supply 38 of the plurality of replaceable supplies 38 is empty ("Y" branch of block 254), the printing device 16 determines whether to replace at least one other supply 38 of the plurality (block 256). In some examples, the printing device 16 determines whether to replace the at least one other replaceable supply 38 based at least in part on an amount of printing material remaining for each supply 38 and an amount of printing material corresponding to performing one or more service routines.

In response to determining not to replace at least one other supply 38 ("N" branch of block 256), the printing device 16 selects a particular supply replacement message corresponding to the first supply 38 from a plurality of possible supply replacement messages 40 stored on a memory 124 of the printing device 16 (block 258). In response to determining to replace the at least one other supply 38 ("Y" branch of block 256), the printing device 16 selects a particular supply replacement message 40 corresponding to the first supply 38 and the at least one other supply 38 from a plurality of supply replacement messages 40 stored in the memory 124 of the printing device 16 (block 260). The selected supply replacement message 40 may be output with a user interface of the example printing device (block 262).

In some examples, an example printing device may compare a remaining amount of printing material for each replaceable supply 38 to an amount of printing material corresponding to performing one or more service routines for supply replacement. For example, if an example printing device 16 is configured for CYMK ink supplies, the printing device may compare remaining amounts of ink for each of the CYMK ink supplies to amounts of ink to be used in performing one, two, three, or four service routines.

FIGS. 5A-B provide a flowchart 300 that illustrates an example sequence of operations that may be performed by an example printing device 16 configured to use four replaceable ink supplies. In this example, based on the remaining amount of printing material for each replaceable supply 38 and an amount of printing material corresponding to performing a servicing routine for supply replacement (which in FIGS. 5A-B is referred to with the abbreviation "S.R.") (block 302), the printing device 16 may determine a sum of remaining ink amounts (block 304). For example, if the printing device is configured to use a cyan ink supply (C), a magenta ink supply (M), a yellow ink supply (Y), and a black ink supply (K), and the remaining amount for each is represented by C, Y, M, and K respectively, the sum may be represented by: SUM=C+Y+M+K.

In addition, the printing device 16 may determine a ranking of the replaceable supplies 38 based on the remaining amount of printing material for each replaceable supply 38 (block 306). Generally, the replaceable supplies 38 from the greatest remaining amount of printing material to the least remaining amount of printing material may be referred to as 'MAX', '2ND MAX', '3RD MAX', and '4TH MAX' respectively, where such reference refers to the amount of printing material remaining in the respective replaceable supply 38. In some examples, the 4TH MAX replaceable supply may be empty (i.e., the remaining amount of printing material is determined to be empty). As discussed, the example printing device 16 may analyze the amount of printing material remaining in each replaceable supply 38 and the amount of printing material corresponding to performing one or more service routines for supply replacement. Examples described herein may determine one or more replaceable supplies 38 to replace concurrently based at least in part on an amount of printing material that will be used to perform one or more service routines.

In this example, where the printing device 16 is configured to use four replaceable supplies 38 (e.g., four colors of ink), all the supplies 38 may be replaced concurrently, which would lead to performing one service routine. If three supplies 38 are replaced concurrently and one supply 38 is replaced at a later point, two service routines may be performed—a first service routine corresponding to the concurrent replacement of the three replaceable supplies 38, and a second service routine corresponding to the replacement of the one replaceable supply 38. If two supplies 38 are replaced concurrently and a third supply 38 and a fourth supply 38 are replaced at later points, three service routines may be performed—a first service routine corresponding to the concurrent replacement of the two supplies 38, a second service routine corresponding to replacement of the third supply 38, and a third service routine corresponding to replacement of the fourth supply 38. If all replaceable supplies 38 are replaced separately, four service routines may be performed.

In this example, therefore, the printing device 16 may analyze use of printing material for performing one or more service routines and remaining amounts of printing material for each supply 38 to determine whether printing material may be saved by concurrent replacement of two or more supplies (even if some of the supplies to be replaced, are not empty or have not reached a replacement threshold). In this example, the printing device 16 determines whether the sum of the remaining amounts of printing material is less than the amount of printing material corresponding to performing four service routines less the amount of printing material corresponding to performing one service routine (block 308) (which may be expressed as: Sum<(4−1)S.R.).

In response to determining that the sum of the remaining amounts of printing material is less than the amount of printing material corresponding to performing four service routines less the amount of printing material corresponding to performing one service routine ("Y" branch of block 308), the printing device 16 may determine whether double the amount of printing material remaining for the MAX replaceable supply less the sum of the remaining amounts of printing material is less than the amount of printing material corresponding to performing one service routine (block 310) (which may be expressed as: 2*MAX−SUM<1S.R.). In this example, the printing device may analyze the remaining amount of printing material for the MAX replaceable supply based on the sum of the remaining printing material amounts, the amount of printing material corresponding to performing four service routines, and the amount of printing material corresponding to performing three service routines to ensure that the sum of the remaining amounts of printing material is not substantially composed of the remaining amount of printing material for the MAX replaceable supply.

In response to determining that double the remaining amount of printing material for the MAX replaceable supply less the sum of the remaining printing material amounts is less than the amount of printing material corresponding to performing four service routines less the amount of printing material corresponding to performing three service routines ("Y" branch of block 310), the printing device 16 may select a particular supply replacement message 40 that corresponds to all of the replaceable supplies 38 from a plurality of supply replacement messages 40 (block 312).

In response to determining that the sum of the remaining amounts of printing material is not less than the amount of printing material corresponding to performing four service routines less the amount of printing material corresponding to performing one service routine ("N" branch of block 308) or determining that double the remaining amount of printing material for the MAX replaceable supply less the sum of the remaining printing material amounts is less than the amount of printing material corresponding to performing four service routines less the amount of printing material corresponding to performing three service routines ("N" branch of block 310), the example printing device 16 determines whether the sum of remaining printing material amounts less the remaining printing material amount of the MAX replaceable supply is less than the amount of printing material corresponding to performing three service routines less the amount of printing material corresponding to performing one service routine (block 314) (which may be expressed as: SUM−MAX<(3−1)S.R.).

In response to determining that the sum of remaining printing material amounts less the remaining printing material amount of the MAX replaceable supply is less than the amount of printing material corresponding to performing three service routines less the amount of printing material corresponding to performing one service routine ("Y" branch of block 314), the example printing device 16 may determine whether the remaining amount of printing material for the 2ND MAX replaceable supply less the remaining amount of printing material for the 3RD MAX replaceable supply less the remaining amount of printing material for the 4TH MAX replaceable supply is less than the amount of printing material corresponding to performing a service routine (block 316) (which may be expressed as: 2ND MAX−3RD MAX−4TH MAX<1S.R.).

In response to determining that the remaining amount of printing material for the 2ND MAX replaceable supply less the remaining amount of printing material for the 3RD MAX replaceable supply is less than the amount of printing material corresponding to performing three service routines less the amount of printing material corresponding to performing two service routines ("Y" branch of block 316), the example printing device may select a particular supply replacement message 40 that corresponds to the 2ND MAX replaceable supply, the 3RD MAX replaceable supply, and the 4TH MAX replaceable supply from the plurality of supply replacement messages 40 (block 318).

In response to determining that the sum of remaining printing material amounts less the remaining printing material amount of the MAX replaceable supply is not less than the amount of printing material corresponding to performing three service routines less the amount of printing material corresponding to performing one service routine ("N" branch of block 314), or determining that the remaining amount of printing material for the 2ND MAX replaceable supply less the remaining amount of printing material for the 3RD MAX replaceable supply is not less than the amount of printing material corresponding to performing three service routines less the amount of printing material corresponding to performing two service routines ("N" branch of block 316), the example printing device 16 may determine whether the sum of remaining amounts of printing material less the amount of remaining printing material for the MAX replaceable supply less the amount of remaining printing material for the 2ND MAX replaceable supply is less than the amount of printing material corresponding to performing two service routines less the amount of printing material corresponding to performing one service routine (block 320) (which may be expressed as: SUM−MAX−2ND MAX<(2−1)S.R.).

In response to determining that the remaining amount of printing material for the 3RD MAX replaceable supply is less than the amount of printing material corresponding to performing two service routines less the amount of printing material corresponding to performing one service routine ("Y" branch of block 320), the example printing device 16 may select a particular supply replacement message 40 that corresponds to the 3RD MAX replaceable supply and the 4TH MAX replaceable supply from a plurality of supply replacement messages 40 (block 322).

In response to determining that the remaining amount of printing material for the 3RD MAX replaceable supply is not less than the amount of printing material corresponding to performing two service routines less the amount of printing material corresponding to performing one service routine ("N" branch of block 320), the example printing device 16 may select a particular supply message 40 that corresponds to the 4TH MAX replaceable supply from a plurality of replaceable supply messages (block 324). In some examples, the 4TH MAX replaceable ink supply may correspond to an empty remaining amount, of printing material.

FIG. 6 provides a flowchart 350 that provides an example sequence of operations that may be performed by an example printing device 16. In this example, the printing device 16 monitors a remaining amount of printing material for each of a plurality of replaceable supplies (block 352), and the printing device 16 may determine a first set of one or more supplies 38 of the plurality to replace (block 354). In some examples, the printing device 16 may determine the set of one or more replaceable supplies 38 to replace based at least in part on the remaining amount of printing material for each supply 38 and an amount of printing material corresponding to performing one or more service routines associated with supply replacement. The printing device 16 may monitor for replacement of one or more supplies (blocks 356-358). If replacement is not detected ("N" branch of block 358), the printing device continues monitoring (blocks 356-358). Generally, the printing device 16 may comprise one or more sensors 138 that may transmit sensor data to a processing resource 122 of the printing device 16. In these examples, the printing device 16 may monitor for replacement of supplies 38 by analyzing sensor data from the one or more sensors 138.

In response to detecting replacement of one or more of the supplies ("Y" branch of block 358), the printing device 16 may determine a second set of one or more replaced supplies 38 (block 360). In this example, the printing device 16 compares the one or more supplies 38 of the first set to the one or more supplies 38 of the second set to determine whether the first set corresponds to the second set (block 362). In this example, therefore, one or more supplies 38 of the second set may have been incorrectly loaded concurrent with one or more supplies 38 correctly loaded (i.e., supplies of the first set). In response to determining that the first set does not correspond to the second set ("N" branch of block 362), the example printing device 16 may select a particular supply replacement message 40 corresponding to the one or more incorrect incorrectly replaced supplies 38 (block 364).

In response to determining that the first set corresponds to the second set ("Y" branch of block 362) (i.e., the supplies to be replaced correspond to the supplies that were replaced), the printing device 16 may perform a service routine for supply replacement (block 366). Generally, the printing device 16 may perform a service routine by performing one or more operations that may cause printing material to be ejected from a printhead 42 of the example printing device 16. Generally, a processing resource 122 of the printing device 16 may control the printhead 42 to cause ejection of printing material for a service routine.

To illustrate the example operations of FIG. 6 by way of a detailed further example, the example printing device 16 may be configured to use a cyan ink supply, a magenta ink supply, a yellow ink supply, and a black ink supply. The black ink supply may have a remaining amount of printing material corresponding to empty, and the yellow ink supply may have a remaining amount of printing material such that the example printing device 16 determines that the yellow ink supply should be replaced concurrent with the black ink supply based on an amount of printing material corresponding to performing at least one service routine. In this example, therefore, the black ink supply and the yellow ink supply are determined to be in the first set of ink supplies to replace.

If the printing device 16 detects replacement of the black ink supply and the yellow ink supply (i.e., the second set of ink supplies comprises the black ink supply and the yellow ink supply), the example printing device 16 may determine that the first set corresponds to the second set, and the example printing device 16 may perform a service routine to thereby prime the newly replaced black ink supply and the newly replaced yellow ink supply for use by the example printing device. If, however, the example printing device 16 detects that the black ink supply, the yellow ink supply, and the magenta ink supply have been replaced (i.e., the second set comprises the black ink supply, yellow ink supply, and magenta ink supply), the example printing device 16 may determine that the first set does not correspond to the second set, where the magenta ink supply may be determined to be incorrect. In this example scenario, the example printing device may select a supply replacement message 40 that corresponds to the magenta ink supply. For example, the example printing device may select a particular supply replacement message 40 that indicates that the magenta ink supply should not have been replaced. As will be appreciated, the example printing device 16 may output the selected particular supply replacement message 40 via a user interface 150.

FIG. 7 provides a flowchart 400 that illustrates an example sequence of operations that may be performed by an example printing device 16. In this example, the printing device 16 determines a remaining amount of printing material for each replaceable supply 38 (block 402). Furthermore, the printing device 16 determines a replacement availability for each replaceable supply 38 (block 404). In some examples, the printing device 16 may be connected to a computing system (such as the remote server 102 of FIG. 1) that may store replaceable supply ordering information and/or shipping information. In these examples, the printing device 16 may communicate with the computing system to retrieve replaceable supply availability information corresponding to the printing device 16 and/or an account associated with the printing device 16. For example, if an additional black ink supply and yellow ink supply have been ordered and shipped for use with the printing device 16, the printing device may 106 determine that the replacement availability for the black ink supply and yellow ink supply are a value of one (indicating availability). In some examples, the printing device may determine replacement availability based at least in part on ordering information and/or shipping information. In some examples, the printing device 16 may be configured to determine whether replacement supplies have been delivered based on shipping information received from the computing system.

Based on the remaining amount of printing material for each replaceable supply 38, a replacement availability for each replaceable supply 38, and/or an amount of printing material corresponding to performing a servicing routine, the printing device 16 may determine a set of one or more supplies 38 to replace (block 406). For example, if a printing device 16 configured for use with a cyan ink supply, a magenta ink supply, a yellow ink supply, and a black ink supply determines that all the ink supplies may be replaced concurrently, but the printing device 16 determines that the replacement availability for a cyan ink supply is not available (e.g., a cyan ink supply has not been ordered or delivered), the printing device 16 may determine the set of ink supplies to replace to include the magenta ink supply, the yellow ink supply, and the black ink supply. Therefore, in some examples, a printing device 16 may determine supplies 38 to replace based at least in part on supply replacement availability.

FIG. 8 provides a flowchart 450 that illustrates an example sequence of operations that may be performed by an example printing device 16. In this example, a set of one or more replaceable supplies 38 to replace may be determined (block 452), and the printing device 16 may monitor for a supply replacement command (blocks 454-456). Generally, a user may input data via a user interface 150 that indicates that the user wishes to replace supplies, and a processing resource 122 of the example printing device may process such input data as a replacement command. If the processing resource 122 of the printing device does not detect a replacement command ("N" branch of block 456), the printing device continues monitoring (blocks 454-456).

In response to detecting a replacement command ("Y" branch of block 456), the processing resource 122 of the printing device 16 controls a supply interface 136 based on the set of one or more supplies 38 to replace (block 458). For example, the processing resource 122 may selectively unlock a supply coupling mechanism 140 associated with each replaceable supply 38 of the set. As another example, the processing resource 122 may move each supply 38 of the set to a position for replacement. As another example, the processing resource 122 may actuate one or more indicators associated with the supplies 38 of the set. In addition, the example printing device 16 (and the processing resource thereof 122) may prevent replacement of one or more replaceable supplies 38 that are not to be replaced (i.e., not in the set). After replacement of the one or more replaceable supplies 38 of the set, the printing device 16 may perform a service routine (block 462) to prime the replaced supplies 38 for use thereby.

Turning now to FIGS. 9A-B, these figures provide a flowchart 500 that illustrates an example sequence of operations that may be performed by an example printing device 16 and/or stored as instructions in a machine-readable storage medium. In this example, a number of supplies (N) that the example printing device 16 is configured to use, a remaining amount of printing material for each supply, and an amount of printing material corresponding to performing one or more service routines (S.R.) may be analyzed (block 502). If N corresponds to a number of replaceable supplies 38 that the example printing device 16 is configured to use concurrently, the example printing device may initially determine a set of replaceable supplies 38 to consider (M) equal to N (block 504). For example, if an example printing device 16 is configured for CMYK ink printing, N may be four, and initially, M may be set to four (i.e., the set to consider for replacement initially includes all the supplies). Generally, the set of replaceable supplies to consider (M) corresponds to the supplies that the printing device is considering for concurrent replacement based on the amount of printing material remaining in each replaceable supply 38 and the amount of printing material corresponding to performing one or more service routines associated with supply replacement.

The printing device 16 determines a sum of the remaining amounts of printing material for the supplies in the set to be considered for replacement (referred to as set M) (block 506). The printing device determines the amount of printing material corresponding to performing a service routine associated with the set of M replaceable supplies (block 507). The printing device 16 determines a ranking of the supplies included in set M based on the remaining amount of printing material for each supply (block 508). The supply 38 having the greatest amount of remaining printing material may be considered the MAX supply; the supply 38 having the second greatest amount of remaining printing material may be considered the 2ND MAX supply; and the remaining supplies 38 of set M are ranked accordingly, where the supply 38 having the least amount of remaining printing material may be considered the MTH MAX supply. In some examples, the MTH MAX supply may have a remaining amount of printing material corresponding to a predefined replacement threshold and/or an approximately zero amount.

The example printing device 16 determines whether the sum of remaining amounts of printing material is less than the amount of printing material corresponding to performing a service routine for replacement of each supply 38 of set M less the amount of printing material corresponding to performing one service routine (block 510) (which may be expressed as: SUM<(M−1)S.R.). In response to determining that the sum of remaining amounts of printing material is less than the amount of printing material corresponding to performing a service routine for replacement of each supply 38 of set M less the amount of printing material corresponding to performing one service routine ("Y" branch of block 510), the printing device 16 determines whether double the remaining amount of printing material for the MAX supply less the sum of the remaining amounts is less than the amount of printing material corresponding to performing one service routine (block 512) (which may be expressed as: 2*MAX−SUM<1S.R.).

In some examples, responsive to determining that double the remaining amount of printing material for the MAX supply less the sum of the remaining amounts is less than the amount of printing material corresponding to performing one service routine ("Y" branch of block 512), the example printing device 16 may select a particular supply replacement message 40 that corresponds to all supplies 38 of set M from a plurality of supply replacement messages 40 (block 514). As discussed previously, in some examples, replacement availability may be considered when determining supplies 38 to replace. Therefore, as shown, in some examples, the printing device 16 may determine whether each supply 38 of set M is available for replacement (block 516). In these examples, if the supplies 38 of set M have replacement availability ("Y" branch of block 516), the example printing device 16 may select a particular supply replacement message 40 corresponding to all the supplies 38 of set M (block 514).

Continuing to FIG. 9B by way of connector 'B', responsive to determining that the sum of remaining amounts of printing material is not less than the amount of printing material corresponding to performing a service routine for replacement of each supply 38 of set M less the amount of printing material corresponding to performing one service routine ("N" branch of block 510), responsive to determining that double the remaining amount of printing material for the MAX supply less the sum of the remaining amounts is not less than the amount of printing material corresponding to performing one service routine ("N" branch of block 512), or responsive to determining that at least one supply 38 of set M is not available for replacement ("N" branch of block 516), the printing device determines whether the number of supplies in the set of supplies considered for replacement (i.e., set M) is greater than two supplies (block 518) (which may be expressed as: M>2). If the number of supplies of the set of supplies considered for replacement is less than or equal to two ("N" branch of block 518), the printing device 16 may select a particular supply message 40 corresponding to the MTH supply (block 520)—i.e., the replaceable supply 38 having the lowest amount of remaining printing material.

In response to determining that the number of supplies of set M is greater than two ("Y" branch of block 518), the printing device 16 may disregard the MAX supply, such that the set of supplies to be considered (i.e., set M) is reduced by one replaceable supply (block 522) (which may be expressed as: M=M−1). To illustrate by way of example, if an example printing device 16 is configured to, use a cyan ink supply, a magenta ink supply, a yellow ink supply, and a black ink supply, and the cyan ink supply is determined to be the MAX supply, the example printing device 16 may disregard the cyan ink supply, and the set of supplies to be considered may be reduced to include the magenta ink supply, the yellow ink supply, and the black ink supply.

After reducing the set of replaceable supplies to be considered by disregarding the MAX supply (i.e., M=M−1), the process returns to block 508 by way of connector 'A', and the process may consider the replaceable supplies of the updated set of supplies to be considered for replacement. As will be appreciated, the example printing device 16 and the process illustrated by flowchart 500 therefore iteratively determines whether to replace N, N−1, N−2, . . . or 1 replaceable supplies concurrently based at least in part on a remaining amount of printing material for each replaceable supply 38 and a remaining amount of printing material corresponding to performing one or more service routines. Therefore, in this example, the printing device 16 determines whether to replace all of the supplies of the plurality of replaceable supplies (e.g., initial set M) concurrently. Responsive to determining not to replace all of the supplies concurrently, the printing device 16 determines whether to replace a subset of the supplies (e.g., M−1, M−2, etc.) of the plurality of supplies concurrently. Responsive to determining not to replace the subset of the supplies concurrently, the printing device determines to replace the replaceable supply 38 having the lowest remaining amount of printing material (i.e., the MTH supply).

Therefore, examples described herein may monitor printing material levels and determine printing material supplies to replace based at least in part on an amount of printing material corresponding to performing one or more service routines. As will be appreciated, some examples may lead to reduced printing material usage by reducing an amount of printing material used in performing service routines. In addition, some examples may lead to reduced printing material waste by identifying and/or facilitating replacement of some supplies. Furthermore, some examples may lead to reduced printing material waste by preventing replacement of some supplies. Because some examples generally balance a remaining amount of printing material for one or more non-empty supplies with an amount of printing material to be used in performing one or more service routines, savings may be realized in example printing devices, processes, methods, and/or computer program products embodied in machine-readable storage mediums comprising executable instructions.

In addition, while various examples are described herein, elements and/or combinations of elements may be combined and/or removed for various examples contemplated hereby. For example, the example operations provided herein in the flowcharts of FIGS. 3-9B may be performed sequentially, concurrently, or in a different order. Moreover, some example operations of the flowcharts may be added to other flowcharts, and/or some example operations may be removed from flowcharts. Furthermore, in some examples, various components of the example printing devices of FIGS. 1 and 2A-C may be removed, and/or other components may be added. Similarly, in some examples various instructions of the example memories and/or machine-readable storage mediums of FIGS. 1-2E may be removed, and/or other instructions may be added.

The preceding description has been presented to illustrate and describe examples of the principles described. This description is not intended to be exhaustive or to limit examples to any precise form disclosed. Many modifications and variations are possible in light of this description.

The invention claimed is:

1. An inkjet printing device comprising:
   a user interface;
   a plurality of replaceable printing material supplies;
   a printhead to eject printing material stored in the supplies;
   a memory resource to store a replacement threshold for each of the supplies, an amount of printing material to perform a service routine for each of the supplies, and a plurality of supply replacement messages;
   a sensor to determine a remaining amount of printing material in each of the supplies and to detect replacement of a supply;
   a supply replacement engine to determine, based on data from the sensor:
      a first one of the supplies to replace based on the replacement threshold for the first supply; and
      a second one of the supplies to replace based on the amount of printing material corresponding to performing a service routine on the second ink supply;
   a select engine to select a first one of the supply replacement messages that corresponds to replacement of the first and second supplies;
   an output engine to output the first message with the user interface;

a replacement determine engine to determine, based on data from the sensor, replacement of the first supply, the second supply, and a third one of the supplies; and wherein the select engine is to select a second one of the supply replacement messages that corresponds to an incorrectly replaced supply in response to a determination of replacement of the third ink supply; and the output engine is to output the second message with the user interface.

2. The printing device of claim 1, wherein the sensor comprises multiple sensors.

3. The printing device of claim 1, further comprising:
a replaceable supply interface to removably couple the plurality of replaceable supplies; and
a control engine to control the replaceable supply interface to facilitate replacement of a supply.

4. A non-transitory machine-readable storage medium comprising instructions executable by a processing resource of a printing device to cause the printing device to:
determine an amount of printing material in each of a plurality of replaceable printing material supplies;
based on a determined amount, detect an empty first one of the supplies;
in response to detection of an empty first supply, determine to replace the first supply;
in response to a determination to replace the first supply and based on a determined amount, detect an amount of printing material in a second one of the supplies is less than an amount of printing material corresponding to performance of a service routine on the second supply;
in response to detection of a less than amount in the second supply, determine to replace the second supply;
select, from a plurality of supply replacement messages stored in a memory resource associated with the printing device, a first one of the messages that corresponds to replacement of the first supply and the second supply;
output the first message to a user interface;
detect replacement of the first supply, the second supply and a third one of the supplies;
in response to detection of replacement of the third supply, select a second one of the supply replacement messages that corresponds to an incorrectly replaced supply; and
output the second message to the user interface.

5. A method for an inkjet printing device with replaceable printing material supplies, the method comprising:
determining an amount of printing material in each of the supplies;
based on the amount determining, detecting an empty first one of the supplies;
in response to detecting the empty first supply, determining to replace the first supply;
in response to determining to replace the first supply and based on the amount determined, detecting an amount of printing material in a second one of the supplies is less than an amount of printing material corresponding to performing a service routine on the second supply;
in response to detecting the less than amount in the second supply, determining to replace the second supply;
selecting, from a plurality of supply replacement messages stored in a memory resource associated with the printing device, a first one of the messages that corresponds to replacing the first supply and the second supply;
outputting the first message to a user interface;
detecting replacement of the first supply, the second supply and a third one of the supplies;
in response to detecting replacement of the third supply, selecting a second one of the supply replacement messages that corresponds to an incorrectly replaced supply; and
outputting the second message to the user interface.

* * * * *